United States Patent
Johnson et al.

(10) Patent No.: US 7,294,263 B2
(45) Date of Patent: Nov. 13, 2007

(54) DUAL TRANSMISSION FILTER DESIGN

(75) Inventors: Kent Johnson, Ypsilanti, MI (US);
John C. Schultz, Saline, MI (US);
Csilla B. Ujvary, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 147 days.

(21) Appl. No.: 11/311,059

(22) Filed: Dec. 19, 2005

(65) Prior Publication Data

US 2006/0175239 A1    Aug. 10, 2006

Related U.S. Application Data

(60) Provisional application No. 60/651,165, filed on Feb. 9, 2005.

(51) Int. Cl.
*B01D 35/30* (2006.01)
*B01D 35/02* (2006.01)

(52) U.S. Cl. .............. 210/232; 210/323.1; 210/167.08; 210/416.5

(58) Field of Classification Search ................ 210/232, 210/323.1, 167.08, 416.5
See application file for complete search history.

(56) References Cited

U.S. PATENT DOCUMENTS

| | | | | |
|---|---|---|---|---|
| 3,056,501 | A * | 10/1962 | Thorman et al. | 210/132 |
| 3,664,509 | A * | 5/1972 | Grill | 210/391 |
| 4,496,460 | A * | 1/1985 | Haarstad et al. | 210/132 |
| 5,766,468 | A * | 6/1998 | Brown et al. | 210/323.2 |
| 5,922,199 | A * | 7/1999 | Hodgkins | 210/256 |
| 6,793,812 | B2 * | 9/2004 | Caldwell et al. | 210/167.04 |

* cited by examiner

*Primary Examiner*—Thomas M. Lithgow

(57) ABSTRACT

A method and apparatus for a compact dual transmission filter design is provided. More precisely, a single filter housing is adapted to accommodate a primary filter and an auxiliary filter in fluid communication with a primary pump and auxiliary pump, respectively. The single filter housing having two filters disposed therein is more compact than a conventional design incorporating a separate filter housing for each filter.

15 Claims, 3 Drawing Sheets

DUAL TRANSMISSION FILTER DESIGN

CROSS-REFERENCE TO RELATED APPLICATIONS

This application claims the benefit of U.S. Provisional Application 60/651,165, filed Feb. 9, 2005, and which is hereby incorporated by reference in its entirety.

TECHNICAL FIELD

The present invention is drawn to a dual transmission filter design.

BACKGROUND OF THE INVENTION

Conventional transmission pumps are driven by output from the engine. When a hybrid vehicle is being electrically operated, the engine is off and therefore the conventional transmission pump is not operational. An auxiliary electric pump may therefore be implemented for purposes such as meeting the cooling and lubrication needs of a hybrid vehicle transmission when the engine is off. Each of the pumps in a hybrid transmission require a filter element through which transmission fluid is drawn. There is, however, limited space available within the hybrid transmission such that a compact design for the transmission filters would be desirable.

SUMMARY OF THE INVENTION

A method and apparatus for a compact dual transmission filter design is provided. More precisely, a single filter housing is adapted to accommodate a primary filter and an auxiliary filter in fluid communication with a primary pump and auxiliary pump, respectively. The single filter housing having two filters disposed therein is more compact than a conventional design incorporating a separate filter housing for each filter.

The apparatus of the present invention includes a dual pump and filter assembly. The primary pump has a pump body defining an inlet bore. The auxiliary pump has a mounting surface defining an inlet aperture which is generally perpendicular to the inlet bore of the primary pump. The filter assembly includes a filter housing having a primary and auxiliary filter disposed therein.

The filter housing includes a primary outlet portion defining a primary outlet passage. The primary outlet portion is adapted to extend into the pump inlet bore such that the primary outlet passage is in fluid communication with the primary pump. The filter housing also includes an auxiliary outlet portion defining an auxiliary outlet passage. The auxiliary outlet portion terminates in a mounting flange adapted for attachment to the mounting surface of the auxiliary pump such that the auxiliary outlet passage is in fluid communication with the auxiliary pump. According to a preferred embodiment, the mounting flange is attached to the mounting surface with a seal. The filter housing further includes an inlet portion defining a primary inlet passage and an auxiliary inlet passage.

A sump or reservoir, preferably containing hydraulic fluid, is in fluid communication with the primary inlet passage and the auxiliary inlet passage of the filter housing. In this manner, the primary pump can draw fluid from the reservoir through the primary filter and the auxiliary pump can draw fluid from the reservoir through the auxiliary filter.

A method of the present invention discloses assembling the filter to the primary and auxiliary pumps in the following manner. First, the primary outlet portion of the filter housing is engaged with the inlet bore of the primary pump such that the primary outlet passage is in fluid communication with the primary pump. Thereafter, the filter assembly is rotated about the primary outlet portion until the auxiliary outlet portion engages the auxiliary pump and the auxiliary outlet passage is in fluid communication with the auxiliary pump. Finally, the auxiliary outlet portion of the filter housing is attached to the auxiliary pump with a face seal disposed therebetween.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
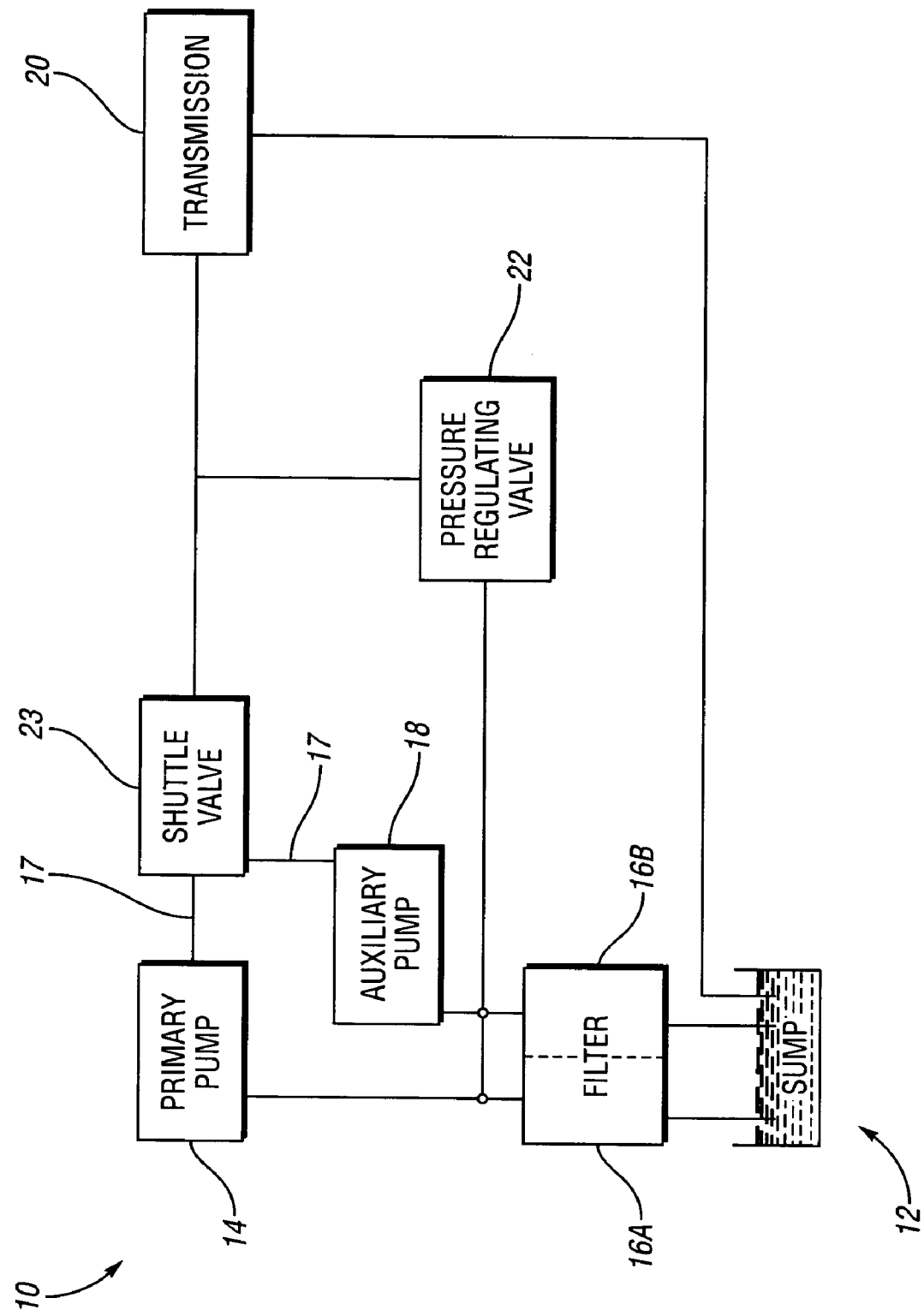
FIG. 1 is a schematic diagram of a portion of a hydraulic system incorporating the present invention.

Referring to the drawings wherein like characters represent the same or corresponding parts through the several views, there is shown in FIG. 1 a schematic representation of a transmission fluid distribution system 10. The fluid distribution system 10 includes a sump or reservoir 12 preferably containing hydraulic fluid. A primary pump 14 draws hydraulic fluid from the reservoir 12 through a filter 16A. An auxiliary pump 18 draws hydraulic fluid from the reservoir 12 through a filter 16B. A control module (not shown) selects which of the pumps 14, 18 is active based on, for example, vehicle speed, pressure requirements, cooling requirements, operational status of vehicle components, etc. The pumps 14, 18 deliver pressurized hydraulic fluid to a transmission 20. A shuttle valve 23 combines the output 17 of both pumps 14, 18 and delivers it to a pressure regulator valve 22. The maximum pressure at the pump output 17 is determined by the pressure regulator valve 22, which delivers excess pump flow back to the inlet of the primary pump 14. According to a preferred embodiment of the present invention, the hydraulic fluid first satisfies the transmission pressure requirements, then satisfies the torque converter pressure requirements, then supplies some lube and cooling, and thereafter the excess fluid is returned to the inlet of the primary pump 14.

Figure 2:
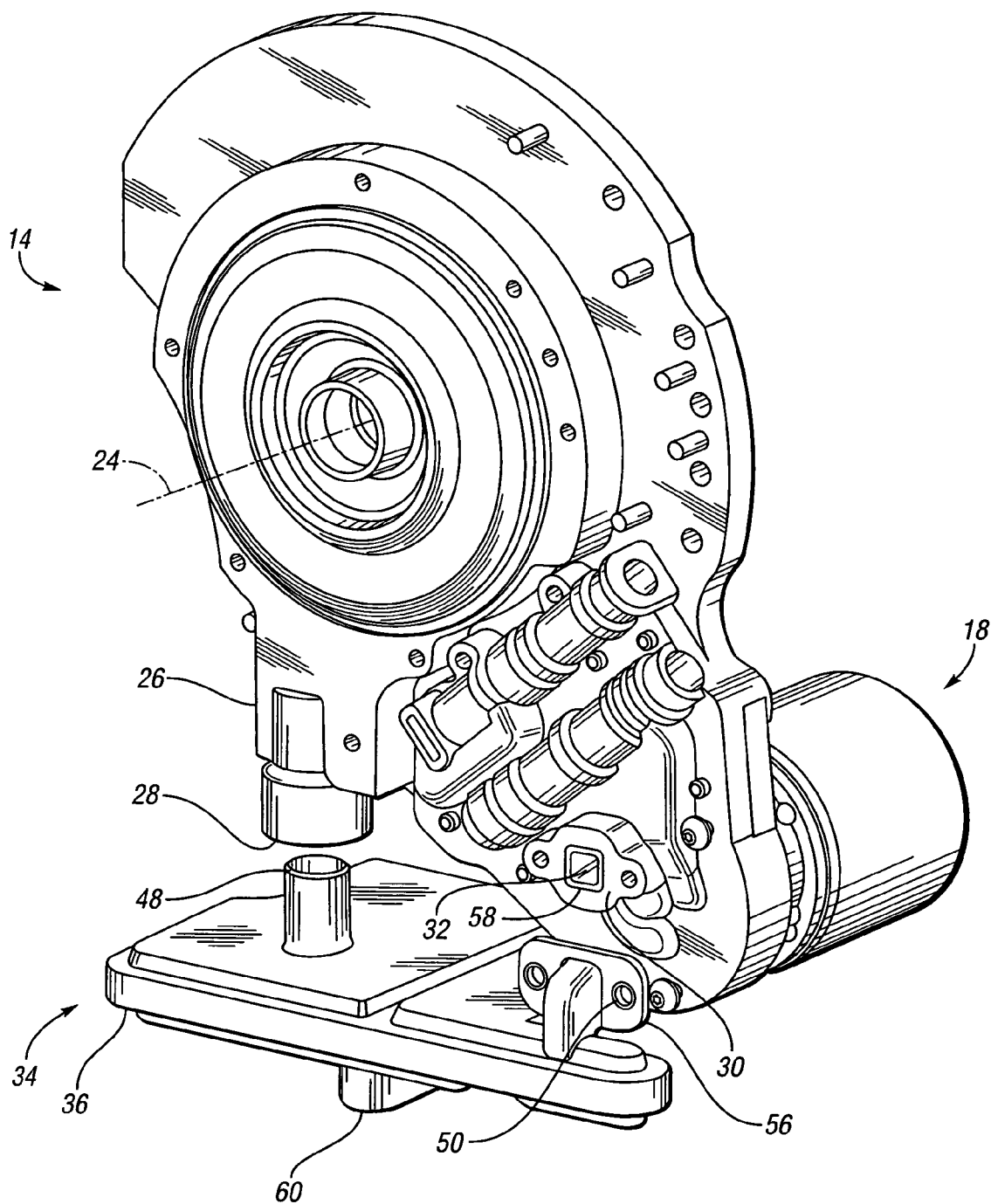
FIG. 2 is an isometric view of a primary pump, a secondary pump and a filter assembly incorporating the present invention.

Referring to FIG. 2, the primary pump 14 is an on-axis pump driven by output from the engine (not shown). As will be appreciated by one skilled in the art, the pump 14 is "on-axis" because it has a centerline 24 that is concentric with the input axis of the transmission (not shown). The pump 14 includes a pump body 26 configured to define a generally cylindrical inlet bore 28. The auxiliary pump 18 is an off-axis pump that is preferably electrically driven, however, the pump 18 may alternatively be driven by any presently known device adapted for such purpose. The auxiliary pump 18 includes a mounting surface 30 defining an inlet aperture 32 that is generally perpendicular to the inlet bore 28 of the primary pump 14.

Figure 3:
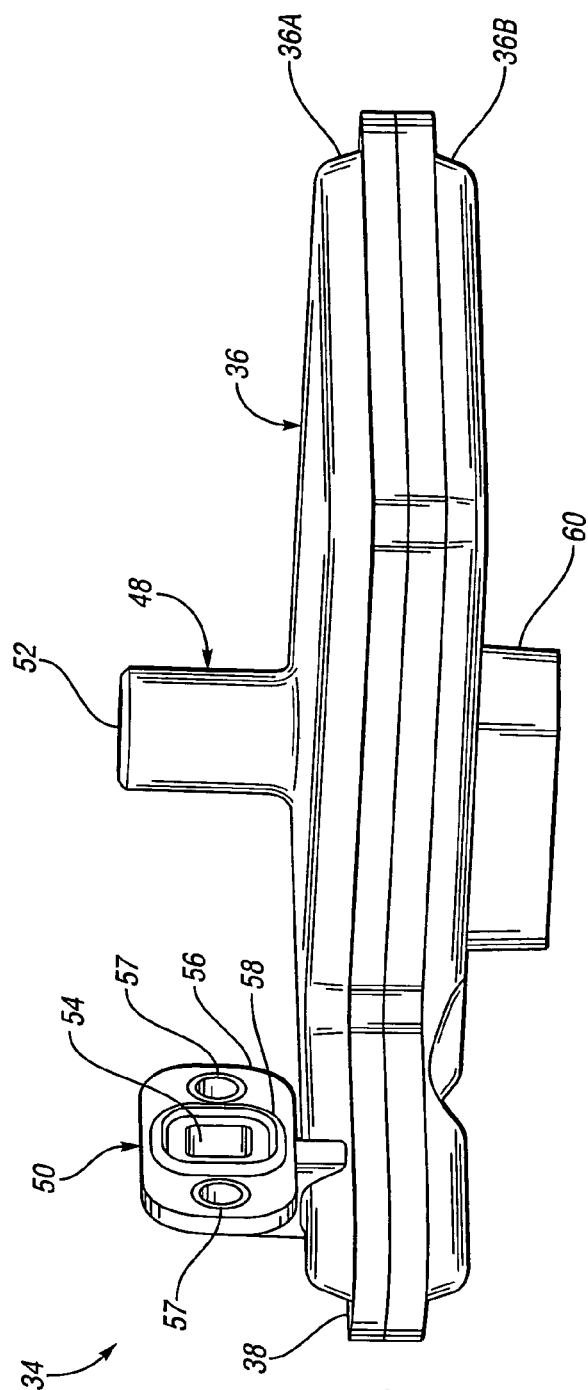
FIG. 3 is an isometric view of the filter assembly of FIG. 2.

Referring to FIG. 3, a filter assembly 34 includes a single housing 36 having the filters 16A, 16B (shown in FIG. 4) disposed therein. The housing 36 is comprised of an upper housing member 36A and a lower housing member 36B attached thereto. According to a preferred embodiment, the housing members 36A and 36B are sonically welded together after the filters 16A, 16B are installed therein, however, the housing members 36A, 36B may alternatively be attached in any conventional manner. As will be appreciated by one skilled in the art, the sonic welding process requires a flange 38 of approximately 10 mm around the entire periphery of the housing 36.

The design of the filter assembly 34 which is adapted to accommodate two filters 16A, 16B (shown in FIG. 4) within a single housing 36 having a single weld flange 38 contributes to the compact design of the present invention. A conventional dual filter design requires dual filter housings, and each filter housing includes a flange similar to the flange 38. It should be appreciated that it is less efficient to package two filter housings each having a 10 mm peripheral flange than a comparable single housing having a single 10 mm peripheral flange. In other words, the peripheral flange requires more space on a dual housing design than on a comparable single housing design. Additionally, a conventional dual filter housing design is less compact because it requires additional space between the two filter housings to account for variation.

The upper housing member 36A includes a primary outlet portion 48 and an auxiliary outlet portion 50. The primary outlet portion 48 is generally cylindrical and extends substantially perpendicularly from the filter housing 36. The primary outlet portion 48 defines a primary outlet passage 52 in fluid communication with the inlet bore 28 of the primary pump 14 (shown in FIG. 1). The auxiliary outlet portion 50 defines an auxiliary outlet passage 54 and terminates in a mounting flange 56. The mounting flange 56 preferably has a face seal 58 attached thereto. The auxiliary outlet passage 54 terminates at the mounting flange 56 in a direction substantially perpendicular to the primary outlet passage 52. The mounting flange 56 also preferably contains two steel inserts 57 which accommodate a bolted connection to provide compression force to the face seal 58 without cracking the plastic material of the auxiliary outlet portion 50.

Figure 4:
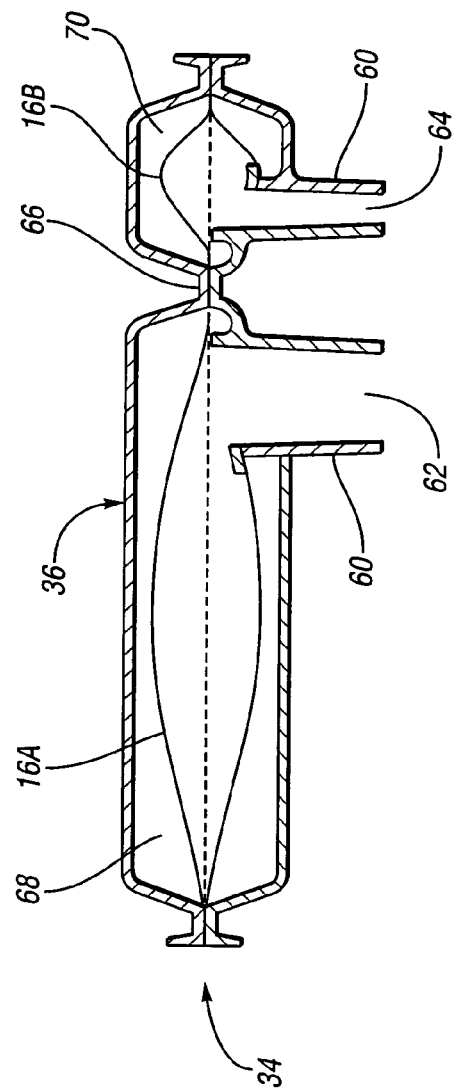
FIG. 4 is a sectional view of the filter assembly of FIG. 2.

The lower housing member 36B includes a filter inlet portion 60. As best seen in FIG. 4, the filter inlet portion 60 preferably defines a primary inlet passage 62 and an auxiliary inlet passage 64. The primary filter inlet passage 62 is in fluid communication with the primary filter 16A and the sump 12 (shown in FIG. 1). The auxiliary filter inlet passage 64 is in fluid communication with the auxiliary filter 16B and the sump 12.

As shown in FIG. 2, when the filter assembly 34 is in its installed position, the primary outlet portion 48 and an auxiliary outlet portion 50 are preferably positioned vertically above the remainder of the filter assembly 34. This positioning of the primary outlet portion 48 and the auxiliary outlet portion 50 advantageously limits the accumulation of air within the filter assembly 34 when only one of the pumps 14, 18 is operating.

A filter assembly is conventionally attached to a pump by vertically inserting a filter outlet into a pump inlet. It has been observed, however, that the single filter housing 34 of the present invention prohibits the connection of the housing to both the primary and auxiliary pumps in the conventional manner. More precisely, it is impractical to produce a single housing having multiple vertically insertable outlets that are located with the degree of precision necessary for proper engagement with both the primary and auxiliary pumps. In other words, the centerline to centerline distance between multiple vertically insertable outlets cannot be maintained within the tolerance range necessary for proper engagement of both the primary and auxiliary pumps while still achieving satisfactory sealing in both pump inlets. Accordingly, a novel method for attaching the filter assembly to the primary and auxiliary pumps has been developed as will be described in detail hereinafter.

Referring again to FIG. 2, a method for attaching the filter assembly 34 to the primary pump 14 and the auxiliary pump 18 will hereinafter be described. To attach the filter assembly 34 to the primary and auxiliary pumps 14, 18, the primary outlet portion 48 of the filter housing 36 is inserted into the inlet bore 28 of the primary pump 14. Thereafter, the filter assembly 34 is rotated about the centerline of the primary outlet portion 48 until the mounting flange 56 of the auxiliary outlet portion 50 engages the mounting surface 30 of the auxiliary pump 18. The mounting flange 56 is then attached to the mounting surface 30 of the auxiliary pump 18 such that the face seal 58 is compressed therebetween. According to a preferred embodiment, the mounting flange 56 is attached to the mounting surface 30 with threaded fasteners (not shown) disposed through the steel inserts 57 (shown in FIG. 3). The face seal 58 is adapted to accommodate manufacturing variation such that attachment in the manner described hereinabove provides proper engagement of the filter assembly 34 with both the primary and auxiliary pumps 14, 18.

Referring to FIG. 4, a cross sectional view of the filter assembly 34 is shown. According to a preferred embodiment, the filter housing 36 includes a crimped portion 66 to provide a primary portion 68 and an auxiliary portion 70 which respectively house the primary filter 16A and the auxiliary filter 16B. Alternatively, the primary portion 68 and auxiliary portion 70 may be separated in any conventional manner such as with an insert or divider (not shown) disposed therebetween. The primary filter 16A is disposed in the primary portion 68 of the housing 36, and the auxiliary filter 16B is disposed in the auxiliary portion 70 of the housing 36.

While the best modes for carrying out the invention have been described in detail, those familiar with the art to which this invention relates will recognize various alternative designs and embodiments for practicing the invention within the scope of the appended claims.

The invention claimed is:

1. A dual pump and filter assembly comprising:
   a primary pump including a pump body defining an inlet bore;
   an auxiliary pump including a mounting surface defining an inlet aperture generally perpendicular to said inlet bore;
   a filter housing attached to the primary pump and the auxiliary pump, said filter housing including:
      a primary outlet portion defining a primary outlet passage, said primary outlet portion adapted to extend into said pump inlet bore such that the primary outlet passage is in fluid communication with the inlet bore; and
      an auxiliary outlet portion defining an auxiliary outlet passage, the auxiliary outlet portion terminating in a mounting flange wherein the mounting flange is adapted for attachment to the mounting surface of the auxiliary pump such that the auxiliary outlet passage is in fluid communication with the inlet aperture;

a primary filter disposed in the filter housing such that the primary filter is in fluid communication with the primary outlet passage; and an auxiliary filter disposed in the filter housing such that the auxiliary filter is in fluid communication with the auxiliary outlet passage.

2. The dual pump and filter assembly of claim 1, wherein the filter housing includes an inlet portion defining a primary inlet passage and an auxiliary inlet passage.

3. The dual pump and filter assembly of claim 2, further comprising a reservoir in fluid communication with the primary inlet passage and the auxiliary inlet passage.

4. The dual pump and filter assembly of claim 1, wherein the mounting flange of the filter housing includes a face seal adapted to maintain a sealed connection between the mounting flange and the mounting surface of the auxiliary pump.

5. The dual pump and filter assembly of claim 1, wherein the mounting flange of the filter housing includes a plurality of steel inserts adapted to facilitate the connection of the mounting flange to the mounting surface of the auxiliary pump.

6. The dual pump and filter assembly of claim 1, wherein the filter housing includes a crimped portion defining a primary portion and an auxiliary portion.

7. The dual pump and filter assembly of claim 1, wherein the primary outlet portion and auxiliary outlet portion of the filter housing are positioned vertically above the remainder of the filter housing.

8. A dual pump and filter assembly comprising:

a primary pump including a pump body defining an inlet bore;

an auxiliary pump including a mounting surface defining an inlet aperture generally perpendicular to said inlet bore;

a filter housing attached to the primary pump and the auxiliary pump, said filter housing including:

a primary outlet portion defining a primary outlet passage, said primary outlet portion adapted to extend into said pump inlet bore such that the primary outlet passage is in fluid communication with the inlet bore;

an auxiliary outlet portion defining an auxiliary outlet passage, the auxiliary outlet portion terminating in a mounting flange wherein the mounting flange is adapted for attachment to the mounting surface of the auxiliary pump such that the auxiliary outlet passage is in fluid communication with the inlet aperture; and an inlet portion defining a primary inlet passage and an auxiliary inlet passage;

a primary filter disposed in the filter housing such that the primary filter is in fluid communication with the primary inlet passage and the primary outlet passage;

an auxiliary filter disposed in the filter housing such that the auxiliary filter is in fluid communication with the auxiliary inlet passage and the auxiliary outlet passage; and a reservoir in fluid communication with the primary inlet passage and the auxiliary inlet passage.

9. The dual pump and filter assembly of claim 8, wherein the mounting flange of the filter housing includes a face seal adapted to maintain a sealed connection between the mounting flange and the mounting surface of the auxiliary pump.

10. The dual pump and filter assembly of claim 8, wherein the mounting flange of the filter housing includes a plurality of steel inserts adapted to facilitate the connection of the mounting flange to the mounting surface of the auxiliary pump.

11. The dual pump and filter assembly of claim 8, wherein the filter housing includes a crimped portion defining a primary portion and an auxiliary portion.

12. The dual pump and filter assembly of claim 8, wherein the primary outlet portion and auxiliary outlet portion of the filter housing are positioned vertically above the remainder of the filter housing.

13. A method for assembling a pump and filter assembly comprising:

providing a primary pump including a pump body defining an inlet bore;

providing an auxiliary pump including a mounting surface defining an inlet aperture generally perpendicular to said inlet bore;

providing a filter housing including:

a primary outlet portion defining a primary outlet passage; and an auxiliary outlet portion defining an auxiliary outlet passage, the auxiliary outlet portion terminating in a mounting flange;

providing a primary filter disposed within the filter housing such that the primary filter is in fluid communication with the primary outlet passage;

providing an auxiliary filter disposed within the filter housing such that the auxiliary filter is in fluid communication with the auxiliary outlet passage;

engaging the primary outlet portion of the filter housing with the pump inlet bore such that the primary outlet passage is in fluid communication with the inlet bore;

rotating the filter housing about the centerline of the primary outlet portion until the mounting flange of the auxiliary outlet portion engages the mounting surface of the auxiliary pump such that the auxiliary outlet passage is in fluid communication with the inlet aperture; and attaching the mounting flange of the housing to the mounting surface of the auxiliary pump.

14. The method of claim 13, further comprising sealing the mounting flange of the housing to the mounting surface of the auxiliary pump.

15. The method of claim 13, further comprising crimping the filter housing to define a primary portion of the filter housing and an auxiliary portion of the filter housing.

* * * * *